United States Patent [19]

Nitadori

[11] 4,220,969
[45] Sep. 2, 1980

[54] DIGITAL SCAN CONVERTER

[75] Inventor: Kazuhiko Nitadori, Tokyo, Japan

[73] Assignee: Oki Electric Industry Co., Ltd., Tokyo, Japan

[21] Appl. No.: 934,058

[22] Filed: Aug. 15, 1978

[30] Foreign Application Priority Data

Aug. 15, 1977 [JP] Japan .................................. 52-96934

[51] Int. Cl.$^2$ ............................................. H04N 5/02
[52] U.S. Cl. .................................. 358/140; 343/5 SC
[58] Field of Search .......... 358/140; 343/5 SC, 5 DP, 343/6 TV

[56] References Cited

U.S. PATENT DOCUMENTS

| 3,653,044 | 3/1972 | Breeze | 343/5 SC |
|---|---|---|---|
| 3,765,018 | 10/1973 | Heard | 343/5 SC |
| 4,002,827 | 1/1977 | Nevin | 343/5 SC |
| 4,065,770 | 12/1977 | Berry | 343/5 SC |
| 4,106,021 | 8/1978 | Katagi | 343/5 SC |
| 4,125,862 | 11/1978 | Catano | 343/5 SC |
| 4,128,838 | 12/1978 | Brands | 343/5 SC |
| 4,149,252 | 4/1979 | Miller | 358/140 |

Primary Examiner—Howard W. Britton
Attorney, Agent, or Firm—Armstrong, Nikaido, Marmelstein & Kubovcik

[57] ABSTRACT

There is disclosed a visual scan converter which accepts digitalized video data in a polar coordinates system from a source such as a radar receiver, a sonar, or an ultrasonic imaging system, and converts the data format to make it suitable for presentation on a cathode ray tube in a standard television or other orthogonal raster at flicker free rates. The input data in a polar coordinates system is first stored in a digital memory, which is read with the orthogonal coordinates system. In reading said digital memory, an orthogonal address generated by a raster address generator is converted to a polar address, which is applier applied to said digital memory. An interpolation is performed for the outputs of the digital memory.

8 Claims, 9 Drawing Figures $r = \sqrt{X^2 + Y^2}$
$\theta = \tan^{-1} \frac{Y}{X}$

DIGITAL SCAN CONVERTER

BACKGROUND OF THE INVENTION

The present invention relates to a scan converter which converts the polar coordinates imaging to the orthogonal coordinates imaging. The images like a sector scan image, PPI (Plan Position Indicator), obtainable in a radar, a sonar, or an ultrasonic video equipment are converted to an orthogonal coordinates system applicable to a raster scan cathode ray tube.

The basic requirement of any scan converter is to accept video data as it becomes available at one particular rate and format and to display the data at a different rate and format. Analog storage tubes have been used for conversion of slow data-rates, such as radar scan data, to high data rates, such as those used for flicker free television or other orthogonal display scans. The analog technique is to store a charge pattern at the sensor scan rate on a dielectric mesh of a cathode ray tube, and to use the charged dielectic mesh to modulate a read beam scanned at a higher rate in the proper format for display on a second cathode ray tube. The modulated read beam develops a video signal in a collector mesh, and this video signal is used to modulate the electron beam of the display tube as that beam is scanned in synchronism with the read beam of the scan converter tube.

However, said prior art which uses a scan converter tube has the disadvantages thay many attachments and components prevent the miniaturization of an apparatus, the price is high, the life time is short, and the picture quality is not good.

Another prior art is U.S. Pat. No. 3,765,018, which utilizes a random access memory instead of a scan converter tube, and the conversion is achieved by generating the loading addresses for putting the data into memory which are representative of the functional relationship between the scan pattern at which the data was derived and that at which it is intended to be displayed. However this prior art has the disadvantage that the picture quality is deteriorated when the quantity of the input polar coordinates data is less, since an interpolation of the data is essentially impossible in this system.

SUMMARY OF THE INVENTION

It is an object, therefore, of the present invention to overcome the disadvantages and limitations of prior scan converters by providing a new and improved scan converter.

It is also an object of the present invention to provide a new and improved scan converter which utilizes a digital memory the address of which is initially generated in an orthogonal coordinates system and is converted to a polar coordinates system to be applied to a memory, and an interpolation is carried out for the outputs of the memory. Thus, according to the present invention, even when the quantity of the input data is less, a picture quality converted to a raster scanning image is satisfactory.

The above and other objects are attained by a digital scan converter for converting the coordinates system of a picture signal from a first coordinates system at the first rate to a second coordinates system at the second rate comprising; an input terminal for receiving a time sequential digital data at the first rate with the addresses of the first coordinates system, a digital memory for storing the digital data applied to the input terminal according to the first coordinates addresses, a synchronization signal generator, a raster address generator which generates the addresses in the second coordinates system synchronized with the output of said synchronization signal generator, a coordinates system converter for converting the second coordinates system from said raster address generator to the first coordinates system, an address generator for composing the addresses of said digital memory in the first coordinates system according to the output of said coordinates system converter, a fixed coefficient memory for storing the sampling function, an interpolation circuit connected both the outputs of said digital memory and said coefficient memory for carrying out the interpolation for the output of said digital memory, and an output terminal for providing the converted second coordinates image signal with the synchronization signal from said synchronization signal generator and the image signal from the output of said interpolation circuit.

BRIEF DESCRIPTION OF THE DRAWINGS

The foregoing and other objects, features, and attendant advantages of the present invention will be appreciated as the same become better understood by means of the following description and accompanying drawings wherein.

DETAILED DESCRIPTION OF THE PREFERRED EMBODIMENTS

Figure 1:
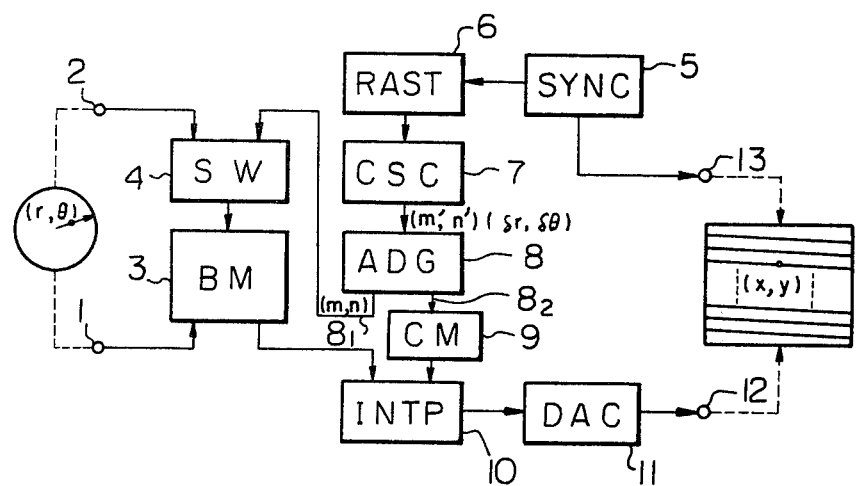
FIG. 1 is a block diagram of an embodiment of the scan converter according to the present invention.

FIG. 1 illustrates a block diagram of the scan converter according to the present invention. In the figure, the reference numeral 1 is the input terminal for receiving the data in the first coordinates system, 2 is the input terminal for receiving the address corresponding to the data at the terminal 1, 3 is a digital buffer memory, 4 is a bus switch, 5 is a synchronization signal generator for generating the synchronization signal for the second coordinates system, 6 is a raster address generator for generating the addresses for the second coordinates system, 7 is a coordinates system converter for converting the second coordinates system to the first coordinates system, and in the present embodiment, the first coordinates system is the polar coordinates system and the second coordinates system is the orthogonal (right angle) coordinates system. 8 is an address generator, 9 is a fixed digital memory storing a coefficient of the sampling function, 10 is an interpolation circuit, 11 is a digital-to-analog converter, 12 is an image output terminal of the second coordinates system, and 13 is the output terminal of the synchronization signal in the second coordinates system.

In the following explanation, the input data is supposed to be in a polar coordinates system, which is to be converted to the orthogonal (rectangular) coordinates system. It is assumed that value is to be provided only at the coordinates lattice points (m Δr, n Δθ), where m and n are integers, and Δr and Δθ are units or steps along the r and θ axes, respectively. It is also assumed that a picture data (or an intensity of a cell) and its address (m, n) in the form of digital code are applied to the data input terminal 1 and the address input terminal 2, respectively.

Initially, when the data in a polar coordinates system is applied to the input terminals 1 and 2, the bus switch 4 selects the address from the input terminal 2 for the digital memory 3. Then, the picture data for one complete picture in the polar coordinates system are stored in the area of the digital memory 3. As the picture data for one complete picture have been stored in the digital memory 3, the bus switch 4 selects one of the outputs $8_1$ of the address generator 8. Then, the raster address generator 6 begins operating with the trigger pulse from the synchronization signal generator 5 and generates orthogonal (rectangular) coordinates (x, y) on the display screen in the order of scanning of the picture one after another. It is assumed that the synchronization signal generator 5 provides both the horizontal synchronization pulses and the vertical synchronization pulses as an usual television system does.

The coordinates system converter 7 converts the orthogonal coordinates (x, y) from the raster address generator 6 to the polar coordinates (r, θ) in accordance with the following relationship, $$\gamma = \sqrt{(x - x_0)^2 + (y - y_0)^2} \quad (1)$$
$$\theta = \tan^{-1}(y - y_0)/(x - x_0)$$

where $(x_0, y_0)$ represent the origin of the polar coordinates system on the display screen. Further, the coordinates system converter 7 divides said values of r and θ, by the sample units Δr and Δθ, respectively, and the quotients m' and n' thus obtained, and the remainder δr and δθ are provided from the coordinates system converter 7.

The address generator 8, based upon (m', n'), generates the address of the digital memory 3, and based upon (δr, δθ), generates the address of the coefficient memory 9 as will be explained later. The address of the digital memory 3 is provided on the output line $8_1$ and the address of the coefficient memory is provided on the output line $8_2$.

Employing the data thus read out by these address signals from the digital memory 3 and the coefficient memory 9, the interpolation circuit 10 calculates the data on the point (r, θ) through the interpolation procedure. The output of the interpolation circuit 10 is applied to the output terminal 12 through the digital-analog converter 11. The image signal thus obtained on the terminal 12 is the picture elements that correspond to the points (x, y) on the orthogonal display screen.

The synchronization signal generator 5 generates the horizontal synchronization pulses and the vertical synchronization pulses in order to synchronize the video signals on the terminal 12 with the sweep signal of the display unit, and said synchronization signal is provided on the terminal 13. Therefore, if the output terminals 12 and 13 are connected to the video input and the synchronization input respectively of the raster scanning display unit, the image data of the polar coordinates is displayed on the orthogonal coordinates screen without distortion. The scan conversion of one complete picture is realized by carrying out the above mentioned operation with respect to the coordinates (x, y) that match with all the picture elements on the display screen of the display unit.

Next, the interpolation according to the present invention will be explained.

It is assumed that an input image data in the polar coordinates system is represented by (f(m Δr, n Δθ)), and the sample units Δr and Δθ are of sufficiently small units, then according to the sampling thereon, image signals f(r,θ) at the point (r,θ) other than the lattice points (mΔr, n Δθ) can be obtained from the data at the lattice points by the following interpolation formula.

$$f(\gamma, \theta) = \sum_{m, n=-\infty}^{\infty} f(m\Delta\gamma, n\Delta\theta) \cdot \quad (2)$$

$$samp(\frac{\gamma}{\Delta\gamma} - m) \cdot samp(\frac{\theta}{\Delta\theta} - n)$$

where
$$samp(u) = sin\pi u/\pi u$$

Here, samp (u) is a sampling function extending to the infinite range of u. However, in practice, it is sufficient to use an approximate function in a limited range. In this case, the sum total of the second formula is also the sum of a finite term.

Normally, it is sufficient to take the sum of four terms each along the r and θ axes. In this case, 16 samples are used to calculate one picture element f(r, θ).

Figure 2:
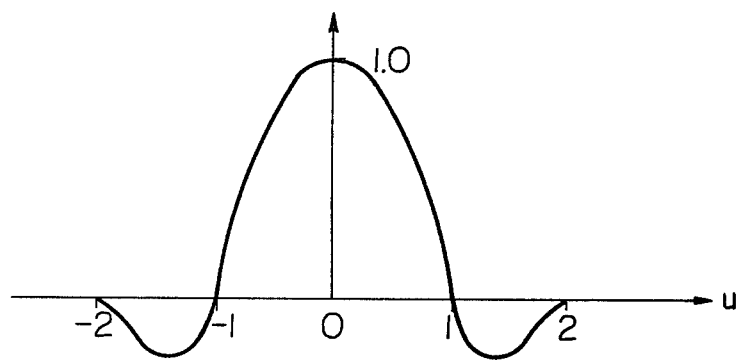
FIG. 2 illustrates an example of sampling function.

FIG. 2 depicts the approximate value of the sampling function samp (u) used in the present embodiment.

The coefficient memory 9 in FIG. 1 is a fixed memory and has the two dimensional arrangement (weight) of the sampling function samp (u) samp (v) sampled with appropriate intervals in both the directions (u) and (v). The address of the fixed memory is represented by (u, v) and the value of samp (u) samp (v) is stored at the address (u, v).

Figure 3:
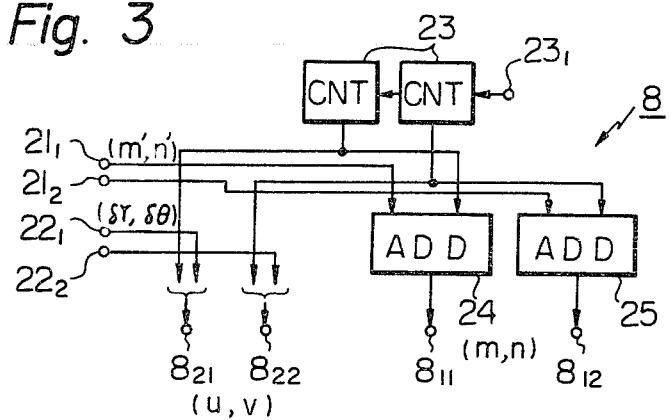
FIG. 3 shows the detailed block diagram of the address generator 8 in FIG. 1.

FIG. 3 shows the detailed block diagram of the address generator 8 in FIG. 1. It is assumed that the terminals ($21_1$, $21_2$) receive the coordinates (m', n') from the converter 7, and the terminals ($22_1$, $22_2$) receive the coordinates (δr, δθ) from the converter 7. These input signals and the output signals from the counters 23 are combined, and then the address (m, n) in the r and θ directions are obtained at the terminals ($8_{11}$, $8_{12}$), and the addresses in the u and v directions of the coefficient memory 9 are obtained at the terminals ($8_{21}$, $8_{22}$). Since the number of terms of the sampling function is 16, then, the counter 23 is a pair of tetranary counters (having 2 bits) connected in series, and each counter has its initial value −1 and the carry is generated in the status 3. The outputs of each tetranary counters are applied to one inputs of the adders 24 and 25 as shown in FIG. 3. At the same time, the outputs of the counters are applied to the most significant two bits of the output terminals ($8_{21}$, $8_{22}$). The coordinates (m', n') applied to the input terminals from the converter 7 become the other inputs of the adders 24 and 25 respectively. The coordinates (δr, δθ) applied to the input terminals ($22_1$, $22_2$) from the converter 7 become the least significant bits of the output terminals ($8_{21}$, $8_{22}$) respectively. The values (−1, −1) are preset in the counters 23 as the initial value, and the content of the counter 23 is stepped up by the clock pulse applied to the terminal $23_1$ one after another. Then, when the inputs (m′, n′) and (δr, δθ) are applied to the address generator 8, the first outputs (m′−1, n′−1) and (−1+δr, −1+δθ) are obtained at the terminals ($8_{11}$, $8_{12}$) and ($8_{21}$, $8_{22}$) respectively. The second outputs are (m′−1, n′) and (−1+δr, δθ), the third ones are (m′−1, n′+1), and (−1+δr, 1+δθ), the fourth ones are (m′−1, n′+2), and (−1+r, 2+δθ), the fifth ones are (m′, n′−1) and (δr, −1+δθ), and the sixteenth outputs are (m′+2, n′+2), and (2+δr, 2+δθ).

Figure 4:
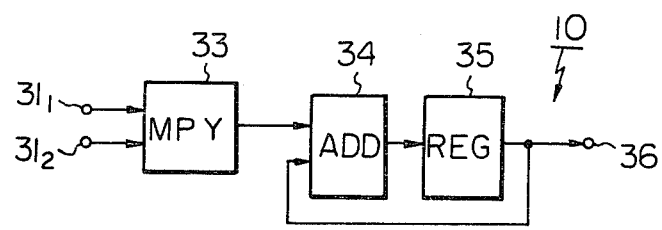
FIG. 4 is the detailed block diagram of the interpolator 10 in FIG. 1.

FIG. 4 shows the block diagram of the interpolation circuit 10 in FIG. 1. In the figure, the reference numerals $31_1$ and $31_2$ are input terminals, 33 is a multiplier, 34 is an adder, 35 is a register, 36 is an output terminal.

The image data and the weight read out from the buffer memory 3 and the coefficient memory 9 respectively are applied to the input terminals $31_1$ and $31_2$. The resultant products are cumulatively added into the accumulator comprising the adder 34 and the register 35. Responding to the 16 addresses from the buffer memory and the coefficient memory generated one after another from the address generator in FIG. 3, a load sum consisting of 16 terms are formed in the interpolator in FIG. 4. This is output to the output terminal 36 as an interpolated image data.

Now, the coordinates system converter 7 in FIG. 1 will be explained. The converter 7 calculates the polar coordinates (r,θ) from the orthogonal coordinates (x, y) through the relationship of the formula (1), divides r and θ thus obtained by Δr and Δθ respectively, and outputs the resultant quotient m′ and n′, and the remainder δr and δθ. These functions are readily realized using an ordinary digital circuit or a micro-computer. However, if attention is drawn to the following the operation time can be effectively shortened.

First, in order to eliminate the division of r and θ by Δr and Δθ, the unit for r and θ is determined so that Δr and Δθ shall be power of 2 (that is Δr and Δθ=1,2,4,8,16, ...). Then, when indicated by a binary number, the upper bits of r and θ become quotient m′ and n′, and the lower bits become the remainder δr and δθ. Also, the process of generating (r,θ) from (x, y) can be shortened as follows.

Figure 5:
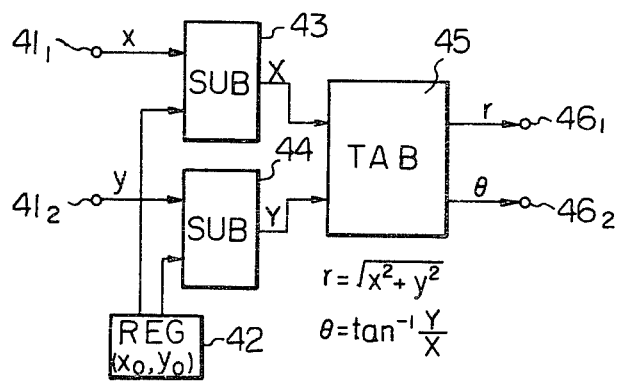
FIG. 5 is the detailed block diagram of the orthogonal-polar address converter 7 in FIG. 1.

FIG. 5 shows the block diagram of the first embodiment of the coordinates system converter 7. In FIG. 5, the reference numerals $41_1$ and $41_2$ are input terminals to receive x and y respectively. 42 is the register which store the origin of the coordinates ($x_0$, $y_0$), 43 and 44 are subtractors. 45 is a function table, $46_1$ and $46_2$ are output terminals. It is supposed that the function table 45 stores the values $r=\sqrt{X^2+Y^2}$ and $\theta=\tan^{-1}(Y/X)$ for the two inputs X and Y, and the subtractors 43 and 44 provide the differences X=x−$x_0$ and Y=y−$y_0$ respectively. Accordingly, the conversion from (x, y) to (r, θ) is immediately effected. However, the apparatus in FIG. 5 has the disadvantatge that the capacity of the function table 45 must be big since two inputs X and Y are applied to the table.

Figure 6:
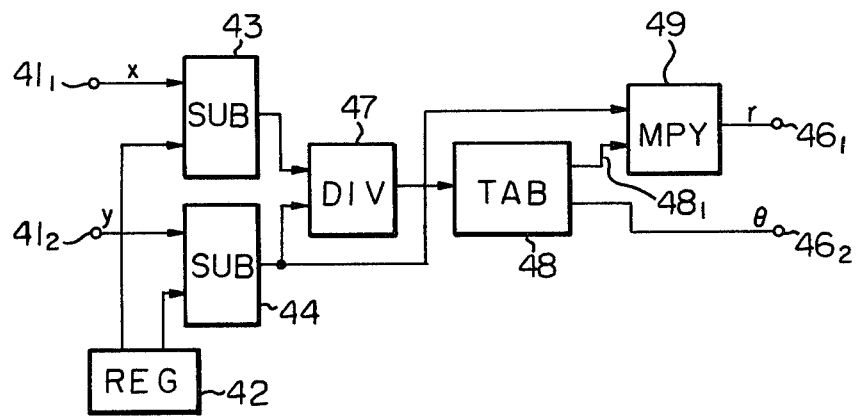
FIG. 6 is the detailed block diagram of another orthogonal-polar address converter 7 in FIG. 1.

FIG. 6 illustrates another embodiment of the coordinates system converter 7. In FIG. 6, the reference numerals $41_1$, $41_2$, 42, 43, 44, $46_1$ and $46_2$ are the same as those in the preceding figure and play the same role. In the embodiment of FIG. 6, the quotient Q=X/Y is calculated by the divider 47 using the differences X and Y from the subtractors 43 and 44, and using the quotient Q the function table 48 is read out. The function table 48 stores $f(Q)=\sqrt{1+Q^2}$, and $\theta=\cot^{-1} Q$, which are output to the terminals $46_1$ and $46_2$ respectively. The value f(Q) on the output line $48_1$ is multiplied by the value of Y from the subtractor 44 through the multiplier 49, and the product of that multiplication is applied to the output terminal $46_1$. It should be noted that the value obtained at the terminal $46_1$ is equal to (r). According to the apparatus in FIG. 6, the capacity of the function table can be small since the function to be stored is merely one variable function, although it takes a long time to calculate the quotient Q.

Figure 7:
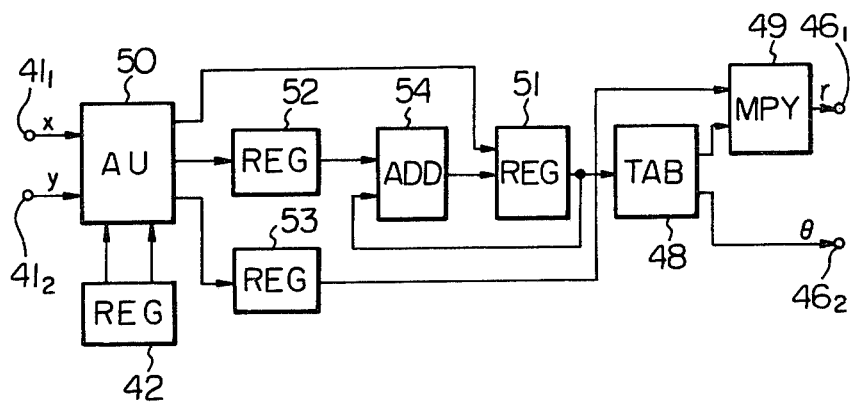
FIG. 7 is the detailed block diagram of still another orthogonal-polar address converter 7 in FIG. 1.

FIG. 7 illustrates still another embodiment of the coordinates system converter 7 in FIG. 1. In this embodiment, the nature that the coordinates (x, y) are generated in order in the raster scanning is utilized. In FIG. 7, the reference numerals $41_1$, $41_2$, 42, 48, 49, $46_1$ and $46_2$ correspond to the components in FIG. 6 with the same identification numeral. The reference numeral 50 is an arithmetic unit having the normal four arithmetical operation function, 51, 52, and 53 are registers, and 54 is an adder. The arithmetic unit 50 calculates the difference Y=y−$y_0$ using y from the input terminal $41_2$ and $y_0$ stored in the register 42, and stores the result Y in the register 53. Then, the quotient Δx/Y, where Δx is the unit or step of x and Y=y−$y_0$ is calculated and the result ΔQ is stored in the register 52. Further, the initial value $x_i$ of the value x is read from the input terminal $41_1$, and the initial value $Q_i$ of the value Q is calculated as follows.

$$Q_i=(x_i-x_0)/Y$$

And the result $Q_i$ is stored in the register 51. The adder 54 accumulates the content ΔQ in the register 52 to the content of the register 51, then, the register 51 provides the quotient Q (=X/Y)=(x−$x_0$)/Y responding to the value x which is increased from the initial value $x_i$ at the rate of unit x. The process of obtaining r and θ from the quotient Q and Y is the same as that in the previous embodiment. It should be appreciated that the arithmetic unit 50, the adder 54, and the registers 51, 52 and 53 can be consolidated into one arithmetic unit, although these units are shown separately for the sake of convenience of the explanation.

Figure 8:
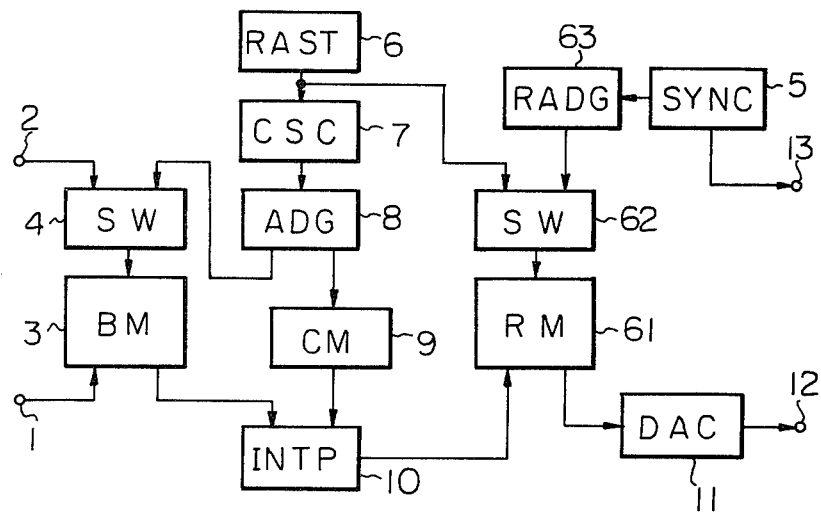
FIG. 8 is a block diagram of another embodiment of the scan converter according to the present invention.

FIG. 8 shows the block diagram of another embodiment of the scan converter according to the present invention, in which a refresh memory for projecting a picture repetitively is installed and so even when the changing speed of the image is slow a picture is projected without flickers.

In FIG. 8, the reference numerals 1 through 13 are the same as those in FIG. 1, 61 is a refresh memory, 62 is a bus switch, and 63 is a read-out address generator. The image signals that match with the addressed (x, y) of the display screen generated from the raster address generator 6 can be obtained in the same way as previously mentioned, and can be obtained at the output of the interpolation circuit 10. When those image signals are obtained at the output of the interpolation circuit 10, the bus switch 62 should be made to select the raster address generator 6 and writes-in those image signals onto an area on the refresh memory 61. The area of the refresh memory 61 is designated by the coordinates (x, y). The refresh memory 61 can also be a conventional digital memory. Any time other than above, the bus switch 62 selects the read out address generator 63. The contents of the refresh memory 61 are read out one after another, triggered by the starting pulse from the synchronization signal generator 5, and the address of the refresh memory in read out cycle is designated by the read out address generator 63, which generates the addresses (x, y) of the screen, synchronous with the sweep signals of the display unit. The output of the refresh memory 61 is applied to the output terminal 12 through the digital-to-analog converter 11. The apparatus in FIG. 8 has the advantage that the scan conversion operation does not need to be synchronized with the operation of a display screen and the conversion is facilitated. Further, if the changing speed of the image is slow, operation speed of the scan converter can be slowed down, and the display unit with short time persistence can be utilized through refreshing.

In the above description, the image data input from the input terminal 1 is supposed to be positive real number data such as brightness signal. However, in the cases of ultra sonic wave image or of microwave image, the image signals may sometimes be obtained as complex data. Such complex data is obtained before the detection stage (quadrature detection) of an ultra sonic wave apparatus or a micro wave apparatus. A complex data is convenient since a more precise picture can be obtained through an interpolation operation from coarser sampling intervals. Therefore, whenever possible it is desirable to provide an interpolation using a complex data. When a complex data is utilized in the present invention, the interpolation circuit 10 in FIG. 1 should be altered from the configuration in FIG. 4 to that in FIG. 9.

Figure 9:
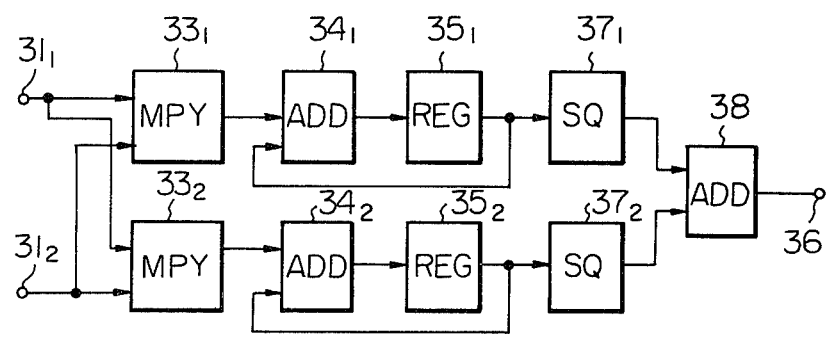
FIG. 9 is another embodiment of the interpolator 10 in FIG. 1.

FIG. 9 shows the block diagram of an interpolation circuit for a complex data. In FIG. 9, the reference numerals $31_1$, $31_2$ and 36 are the same as those in FIG. 4, and the reference numerals $33_1$, $33_2$, $34_1$, $34_2$, $35_1$, $35_2$ correspond to 33, 34 and 35 in FIG. 4. $37_1$ and $37_2$ are a square circuit, and 38 is an adder. The complex data, which is output from the memory 3 is applied to the input terminal $31_1$, and the real component of the complex data is applied to the multiplier $33_1$ while the imaginary component of the complex data is applied to the multiplier $33_2$. The system comprising $33_1$, $34_1$, and $35_1$, and that comprising $33_2$, $34_2$, and $35_2$ operate independently in the same manner as that indicated in FIG. 4, and perform the interpolation operation in the complex region. The resultant outputs pass through the square circuits $37_1$ and $37_2$ and the adder 38. Thus, the strength of the interpolated image signals is identified. That strength becomes the output signal of the interpolation circuit.

As described above, according to the present invention, scan conversion can be accomplished by the digital circuit element without the use of the scan converter of the conventional electron tube, while scan conversion can be performed without geometric distortion and without significant picture quality deterioration. Different from the conventional scan conversion, image signals that match with all the picture elements of the display unit are obtained from interpolation. With the conventional polar coordinate display, the intervals of scanning lines at outer portion of the screen become broader, deteriorating the picture quality. In comparison, the present invention has improved the picture quality by interpolating the intervals of scanning lines making the scanning lines less distinct. Therefore, with coarser density of scanning lines, an image of a better picture quality is obtainable, which is one of the characteristics of the present invention.

The present invention minimizes distortions by the use of the digital circuit. At the same time, the present invention has successfully attained scan conversion with an expected improvement of picture quality through interpolation. Therefore, incorporation of the present invention makes the size of a system smaller, reduces cost, and increases reliability. The present invention can be utilized in scan conversion in the display mechanism of radar, sonar, and ultra sonic wave image.

From the foregoing it will now be apparent that a new and improved scan converter has been found. It should be understood of course that the embodiments disclosed are merely illustrative and are not intended to limit the scope of the invention. Reference should be made to the appended claims, therefore, rather than the specification as indicating the scope of the invention.

What is claimed is:

1. A digital scan converter for converting the coordinate system of a picture signal from a first coordinate system at a first rate to a second coordinate system at a second rate comprising;
   (a) an input terminal for receiving time sequential digital data at the first rate with the addresses of the first coordinate system,
   (b) a digital memory for storing the digital data applied to the input terminal according to the first coordinate addresses,
   (c) a synchronization signal generator,
   (d) a raster address generator which generates the addresses in the second coordinate system synchronized with the output of said synchronization signal generator,
   (e) a coordinate system converter for converting the second coordinate system from said raster address generator to the first coordinate system,
   (f) an address generator for composing the addresses of said digital memory in the first coordinate system according to the output of said coordinate system converter,
   (g) a fixed coefficient memory for storing a sampling function,
   (h) an interpolation circuit connected to the outputs of said digital memory and said coefficient memory for carrying out the interpolation of the output of said digital memory, and
   (i) an output terminal for providing the converted second coordinates image signal with the synchronization signal from said synchronization signal generator and the image signal from the output of said interpolation circuit.

2. A digital scan converter according to claim 1 wherein the first coordinate system is a polar coordinate system and the second coordinate system is the orthogonal coordinate system.

3. A digital scan converter according to claim 2, wherein the coordinate system converter performs the calculation $$r = \sqrt{(x - x_0)^2 + (y - y_0)^2}$$
$$\theta = \tan^{-1}\frac{y - y_0}{x - x_0}$$

where (x, y) are the orthogonal coordinates, $(x_O, y_O)$ are the coordinates of the origin in the orthogonal coordinate system, and (r, $\theta$) are the polar coordinates.

4. A digital scan converter according to claim 1, wherein the interpolation circuit comprises a multiplier for providing the product of the data of a lattice point and a weight defined by the sampling function, and means for accumulating said product.

5. A digital scan converter according to claim 1, wherein the input digital data is a complex data, and the interpolation circuit performs the complex interpolation calculation.

6. A digital scan converter according to claim 1, further comprising a refresh memory connected to said output terminal for storing the output data at a slow rate and reading the same at a high rate.

7. A digital scan converter according to claim 3, wherein $Q=X/Y$ is obtained from $X=x-x_O$ and $Y=y-y_O$, obtaining $f(Q)=\sqrt{1+Q^2}$, and $\theta=\cot^{-1} Q$ using the two function tables, and obtaining the value r as the product of $f(Q)$ and Y.

8. A digital scan converter according to claim 7, wherein means for calculation $Q=X/Y$ comprises a first register for storing $(x_i-x_O/Y)$ (where $x_i$ is the initial value of x), a second register for storing $\Delta x/Y$ (where $\Delta x$ is the unit of x), and an adder for accumulating the content of the second register to the first register.

* * * * *